United States Patent
Bachmann

[11] 3,756,100
[45] Sept. 4, 1973

[54] PIPE CUTTING APPARATUS WITH ROCKING ARM ROLLERS

[76] Inventor: George Bachmann, 945 Metro Dr., Monterey Park, Calif. 91754

[22] Filed: Apr. 25, 1972

[21] Appl. No.: 247,453

[52] U.S. Cl................................................. 82/4 C
[51] Int. Cl............................................... B23b 5/16
[58] Field of Search .............................. 82/4 C, 4 R

[56] References Cited
UNITED STATES PATENTS

| | | | |
|---|---|---|---|
| 3,247,743 | 4/1966 | Frost et al............................. | 82/4 C |
| 3,164,062 | 1/1965 | Hogden et al...................... | 82/4 C X |
| 2,753,739 | 7/1956 | Dreier................................ | 82/4 C X |

*Primary Examiner*—Leonidas Vlachos
*Attorney*—William W. Haefliger et al.

[57] ABSTRACT

Apparatus to cut pipe having inner and outer surfaces and an axis comprises:

a. drive means engageable with one of said inner and outer surfaces for relatively rotating the apparatus and pipe,
b. thrust exerting means engageable with the other of said inner and outer surfaces for locating the pipe with presentation toward the drive means, said thrust exerting means including first and second rocking arms defining pivot axes spaced about said pipe axis and extending generally parallel thereto, and two rollers carried by each arm and spaced apart about the pipe axis, the arms being capable of rocking about said pivot axes to accommodate roller engagement with pipe of different diameters,
c. cutting structure engageable with the pipe to cut a groove in the pipe and extending about the pipe axis in response to said apparatus rotation relatively about the pipe, and
d. support structure carrying said drive means, thrust exerting means and cutting structure.

10 Claims, 6 Drawing Figures

Patented Sept. 4, 1973

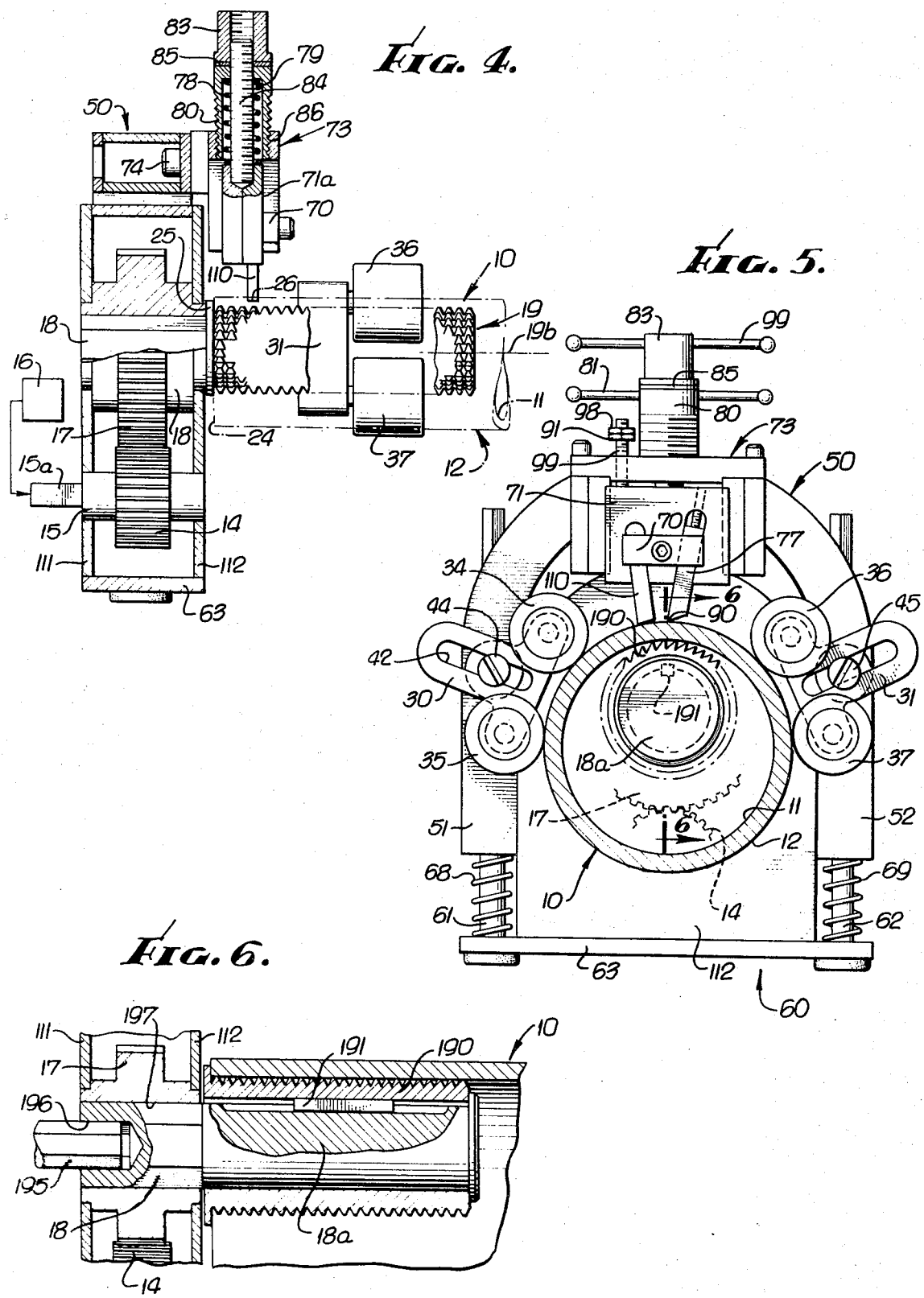

3,756,100

PIPE CUTTING APPARATUS WITH ROCKING ARM ROLLERS

BACKGROUND OF THE INVENTION

This invention relates generally to apparatus for cutting pipe; more particularly, it concerns pipe grooving and cut-off apparatus of improved construction and mode of operation.

There is a need for easily operable and highly reliable equipment for grooving and/or cutting-off metallic pipe of a wide range of diameters, and which can be used on the jobsite. While attempts have been made in the past to meet this need, no apparatus of which I am aware embodies the unusually advantageous features of construction, modes of operation and beneficial results afforded by the present invention, as will be seen. Among these are the capacity for accepting pipe of substantially different diameters, for both grooving and cut-off; portability; spring loading and simultaneous adjustability of the cutter or cutters; integration of all feed and tension controls at one location; improved adjustable mounting of the tool on the pipe for rotation about the pipe during grooving; cutting rate control; capacity for location of the grooving tool at an adjustable distance from the end of the pipe; and additional advantages will be seen.

SUMMARY OF THE INVENTION

It is a major object of the invention to provide pipe cutting apparatus embodying the above advantageous features, modes of operation and results. Basically, the apparatus comprises, in combination, drive means engageable with one of the inner and outer surfaces of the pipe (as for example, the inner surface) for driving the tool about the pipe; thrust exerting means engageable with the pipe for locating same with desired presentation toward the drive means, the thrust exciting means including first and second rocking arms defining pivot axes spaced about the pipe and two thrust rollers carried by each rocking arm, the arms capable of rocking throughout a wide range to accommodate roller engagement with pipe of widely differing diameters; groove or cut-off structure engageable with the pipe as the drive means rotates the device relatively about the pipe; and support structure for the above elements.

More specifically, the support structure may comprise U-shaped frame the legs of which carry the rocking arms spaced from the drive for the drive roller; and the thrust exerting means may include pivots supporting the arms to pivot and there being optional tongue and groove connections between the pivots and arms allowing lengthwise relative shifting of the arms and thrust rollers, as will be seen.

These and other objects and advantages of the invention, as well as the details of an illustrative embodiment, will be more fully understood from the following description and drawings, in which:

DRAWING DESCRIPTION

FIG. 4 is a vertical section taken on lines 4—4 of FIG. 2;

FIG. 5 is a view like FIG. 2, but showing a larger size pipe being grooved; and

FIG. 6 is a section taken on lines 6—6 of FIG. 5.

DETAILED DESCRIPTION

Figure 1:
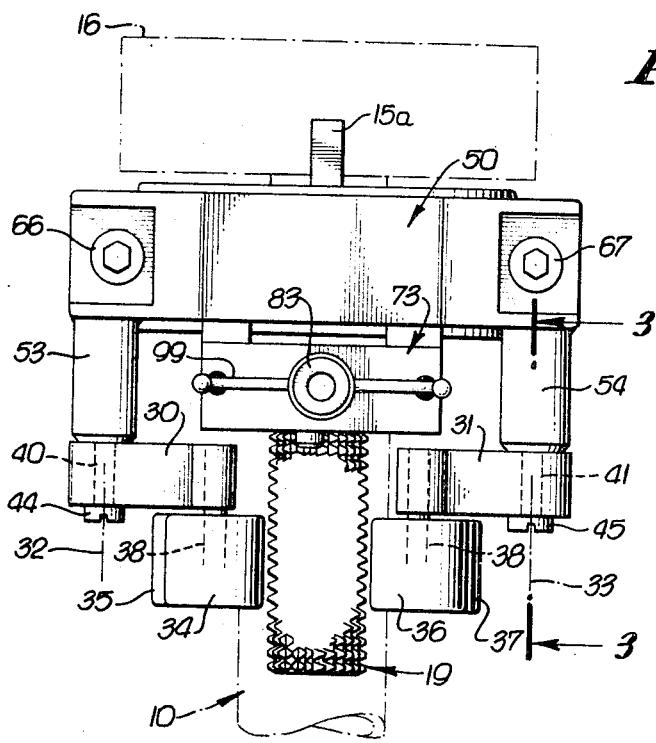
FIG. 1 is a top plan view of one embodiment of the pipe cutting apparatus.
Figure 3:
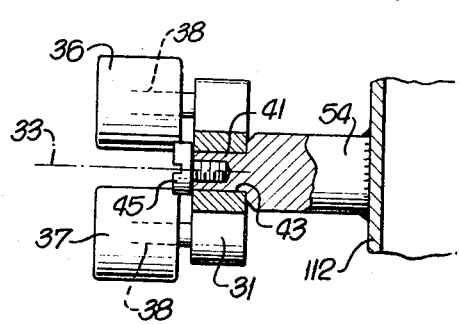
FIG. 3 is a vertical section taken on lines 3—3 of FIG. 1.

In the FIGS. 1-4, apparatus is shown for cutting or grooving pipe 10 having inner and outer surfaces 11 and 12, and an axis 13. Drive means is engageable with one of such surfaces, as for example inner surface 11, for relatively rotating the apparatus and pipe. Such drive means may typically include a special spur gear 14 with a removable drive shaft 15 projecting at 15a for driven connection with a rotary power source 16; a larger and special spur gear 17 (for speed reduction) meshing with gear 14 and driving a shaft 18, and pipe engaging drive roller 19 carried and driven by shaft extension 18a. Shaft 18 may have hexagonal interfit with gear 17 so as to be easily releasable and replaceable. Roller 19 may be suitably retained on the shaft, as for example is described in my U.S. Patent application Ser. No. 128,953, filed Mar. 29, 1971 and now U.S. Pat. No. 3,691,881.

Roller 19 may typically be serrated or toothed at 19a to positively grip and drive pipe surface 11. When the tool is rotated about the pipe by roller 19 (assuming the pipe does not rotate) for example in the direction of arrow 23 in FIG. 2, a stop flange 25 carried by the roller 19, or shaft 18, is urged relatively against the pipe end 24. This enables accurate spacing from that pipe end of the groove 26 cut in the pipe wall by the tool cutter 77. Accordingly, grooves may rapidly be cut in the ends of heavy pipes in the field, without mounting them for rotation, the pipe ends then being capable of joinder as by a coupling interfitting and bridging the grooves as explained in my prior application. Pipe ends may also be cut-off.

Also provided is what may be referred to as thrust exerting means engageable with the other of the inner and outer pipe surfaces (as for example outer surface 12), for locating the pipe with close presentation to the drive roller. The illustrated thrust exerting means includes first and second rocking arms, as for example rocking arms 30 and 31 defining pivot axes 32 and 33 respectively, such axes being spaced about pipe axis 13 and roller axis 19b as well as extending parallel to the latter axes. Further, the thrust exerting means includes two thrust rollers carried by each arm and spaced about the axes 13 and 19b. As illustrated, the rollers 34 and 35 are carried by arm 30, and similar rollers 36 and 37 are carried by arm 31, there being suitable axles 38 carried by the arms and mounting the rollers to freely rotate. As will be seen form FIGS. 2 and 5, the arms are capable of rocking about the pivot axes 32 and 33 to accommodate roller engagement and with, and support of, pipe of widely varying diameters, to enable grooving thereof. If desired, the rollers 34-37 may be helically grooved to urge the pipe relatively toward flange 25, as explained in said application Ser. No. 128,953.

Figure 2:
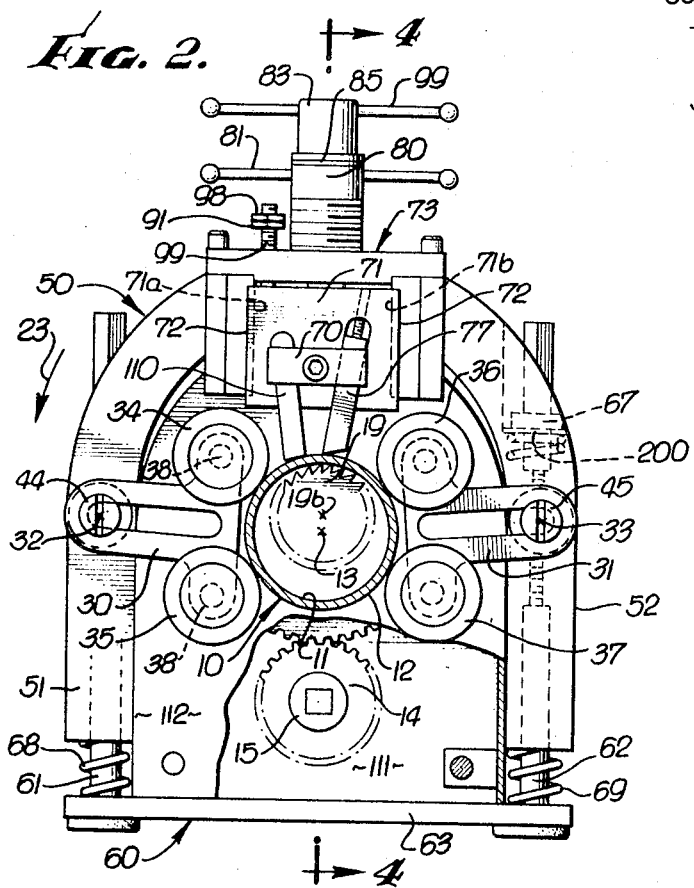
FIG. 2 is a front view of the FIG. 1 apparatus.

The thrust exerting means may also be characterized as including the pivots 40 and 41 supporting the arms for pivoting about axes 32 and 33. If desired, the arms and pivots may have tongue and groove interconnection characterized in that the arms are bodily shiftable endwise and relative to the pivots, as for example within ranges as are defined by the lengths of grooves or slots 42 and 43 forward in the arms. Fasteners 44 and 45 are thread connected as shown in the pivots to clamp the arms when tightened, locking same in positions such as are seen in FIGS. 2 and 5. This also contributes to accommodation of the grooving equipment to pipe of widely different sizes or diameters.

Support structure is also provided to carry the drive means and thrust exerting means as described, as well as the cutting structure to be described. Such structure may advantageously include a first U-shaped frame member 50 the respective legs 51 and 52 of which pivotally carry the rocking arms. Such carriage is provided via the studs 53 and 54 attached to the arms and projecting forwardly, the reduced diameter pivots 40 and 41 being formed at the ends of the studs. This accomplishes spacing of the rocking arms forwardly of the U-shaped structure 50, to allow full range rocking of the arms as needed to accommodate and support a pipe via bearings 34–37. The U-shaped structure may be integral with the front and back cover plates 111 and 112 associated with drive gearing 14 and 17 as referred to.

The support structure may also include a second U-shaped frame member 60 the respective legs 61 and 62 of which are adjustably connected to the legs 51 and 52 of the first U-shape structure 50. As shown, member 60 includes cross-piece 63 extending between legs 61 and 62, the latter fitting in the legs 51 and 52. The ends of the legs 61 and 62 are threaded for connection with nuts 66 and 67 accessible from the top of member 50, and tension springs 68 and 69 urge the member 60 downwardly relative to member 50. Polyurethane bumpers 200 seat the nuts 66 and 67 to accommodate relative movement of frames 50 and 60 tending to occur during roller travel over pipe wall extents of uneven thickness.

FIG. 6 shows the provision of a substantially larger diameter serrated drive roller 190 attached to the drive shaft extension 18a, as via a key 191. The latter roller 190 is sized to drive pipe of larger internal diameter, as seen in FIG. 5. Direct drive is transmitted to shaft 18 in FIG. 6, via input drive member 195 inserted into polygonal recess 196 in the shaft, for more rapid turning of the pipe. Gear 17 has hexagonal coupling to shaft 18 at 197. Shaft 15 and gear 14 may be removed under these conditions.

Referring to FIGS. 2, 4 and 5, a cutting tool head or post 70 is guided for movement toward and away from the pipe 10, as by the dove-tail corners 71a and 71b on a slide 71, which have slide interfit at 72 with support 73. The latter is attached to the U-shaped member 50 as by the fasteners 74.

Means is provided to yieldably urge the slide and post, as well as cutting tool 77 carried by the post, toward the pipe. Such means is shown to include a compression spring 78 the lower end of which engages and urges the slide 71 downwardly, and the opposite or upper end of which engages a shoulder 79 on a first carrier 80 in the form of a sleeve. The latter has threaded engagement at 84 with rotor 83 so as to support the upper end of the spring for movement toward and away from the pipe, thereby to vary the spring compression and downward force exertion on the slide. As will be seen, the spring generates the force yieldably urging the cutter against the pipe, and this force may be varied by rotating the first carrier 80. For this purpose, the carrier may be provided with a handle 81, as seen in FIG. 5.

A second carrier, as for example, may comprise rotor 83, is operatively connected with the post 70 and carried by the first carrier sleeve 80 for adjustable movement displacing the post toward and away from the pipe while spring 78 continues to urge the head and cutter 77 toward the pipe. Carrier rotor 83 is shown as a sleeve having internal threaded connection with the upper portion of a feed screw 84, the lower end of which is attached to slide 71. When rotor sleeve 83 is turned, as by means of handle 99 to retract the screw and also the slide 71, post 70 and cutter 77 away from the pipe, the spring force exerted on the slide is transmitted via the screw to the rotor 83 and urges it into engagement with a thrust bearing 85 on the carrier 80; conversely, when the rotor 83 is turned in the opposite rotary direction to advance the screw 84 and therefore the cutter 77 toward and into engagement with the pipe, the spring force is transferred to the cutter. Such transfer can be determined by observing the disengagement of rotor 83 from the thrust bearing. Accordingly, accurate control of cutting force application generated by a heavy-duty spring is realized, for rapid and accurate pipe cutting.

A guide 110 may also be carried by post 70 to guide in the groove and thereby assure orientation to the post to present the tool 77 squarely to the groove.

In operation, the apparatus is mounted on a pipe as shown on FIG. 2, and the bearing rollers 34–37 are individually adjusted to clamp the pipe inner wall 11 against the drive roller or cylinder 19. At this time, the post 70 may be in retracted position. Next, the carrier 83 is rotated to advance the cutter downwardly into engagement with the pipe, and the carrier is further turned to back away from thrust bearing 85. In this regard, the extent of such back-off may be used to control the depth of grooving, the carrier 83 re-engaging the thrust bearing to limit further cutting when the desired depth is achieved. Normally, however, an adjusting nut 91 on a threaded stud 99 carried by slide 71 is used to limit depth of cut by engagement with the top of support 73. For this purpose, stud 99 may project through an opening in that support. Locking nut 98 locks adjusting nut 91 in selected position. Next, the drive roller 19 is rotated to effect pipe relative rotation and cutting.

It should also be noted that provision for individual adjustability of advancement of the arms 30 and 31 relative to the pipe serves as a means to control the angle of attack of the operative or selected cutter relative to the pipe, for cutting rate control. Thus, in FIG. 2, if rollers 36 and 37 are advanced toward the pipe and rollers 34 and 35 retracted, the cutting edge 90 of tool 77 will have a larger angle of attack relative to the pipe outer surface.

The spring 78 tends to prevent jamming due to the fact that the cutter and post 70 are able to move outwardly relative to the pipe and against spring compression should cutting resistance approach drive force transmitted to the pipe by the drive roller 19. Rollers 34 – 37 may then be adjusted to decrease the cutter angle of attack, to relieve the jamming tendency.

I claim:

1. In apparatus for cutting pipe having inner and outer surfaces and an axis, the combination comprising
   a. drive means engageable with one of said inner and outer surfaces for relatively rotating the apparatus and pipe,
   b. thrust exerting means engageable with the other of said inner and outer surfaces for locating the pipe with presentation toward the drive means, said thrust exerting means including first and second rocking arms defining pivot axes spaced about said pipe axis and extending generally parallel thereto, and two rollers carried by each arm and spaced apart about the pipe axis, the arms being capable of rocking about said pivot axes to accommodate roller engagement with pipe of different diameters, c. cutting structure engageable with the pipe to cut a groove in the pipe and extending about the pipe axis in response to said apparatus rotation relatively about the pipe, and d. support structure carrying said drive means, thrust exerting means and cutting structure.

2. The combination of claim 1 wherein said support structure comprises a first U-shaped frame member the respective legs of which pivotally carry said rocking arms.

3. The combination of claim 2 wherein said rocking arms are axially spaced from said U-shaped structure, whereby said structure may be located at the end of a pipe and while said arms overlie the side of the pipe.

4. The combination of claim 2 wherein said support structure comprises a second U-shaped frame member the respective legs of which are adjustably connected to the legs of the first U-shaped frame member.

5. The combination of claim 4 wherein said drive means comprises a peripherally serrated roller.

6. The combination of claim 5 including a flange integral with said serrated roller and against which the pipe end is engageable.

7. The combination of claim 2 where said cutting structure is carried by the first U-shaped frame member.

8. The combination of claim 1 including said pipe engaged by said thrust rollers and drive means.

9. The combination of claim 1 wherein all of said thrust rollers are rotatably carried by said arms.

10. The combination of claim 1 wherein the thrust exerting means includes pivots supporting the arms for pivoting about said pivot axes, the arms and pivots having tongue and groove interconnection characterized in that the arms are bodily shiftable relative to the pivots.

* * * * *